May 31, 1949.                    S. S. GREEN                       2,471,618
                      INSTRUMENT AND BEARING THEREFOR
Filed May 26, 1943                                            2 Sheets-Sheet 1
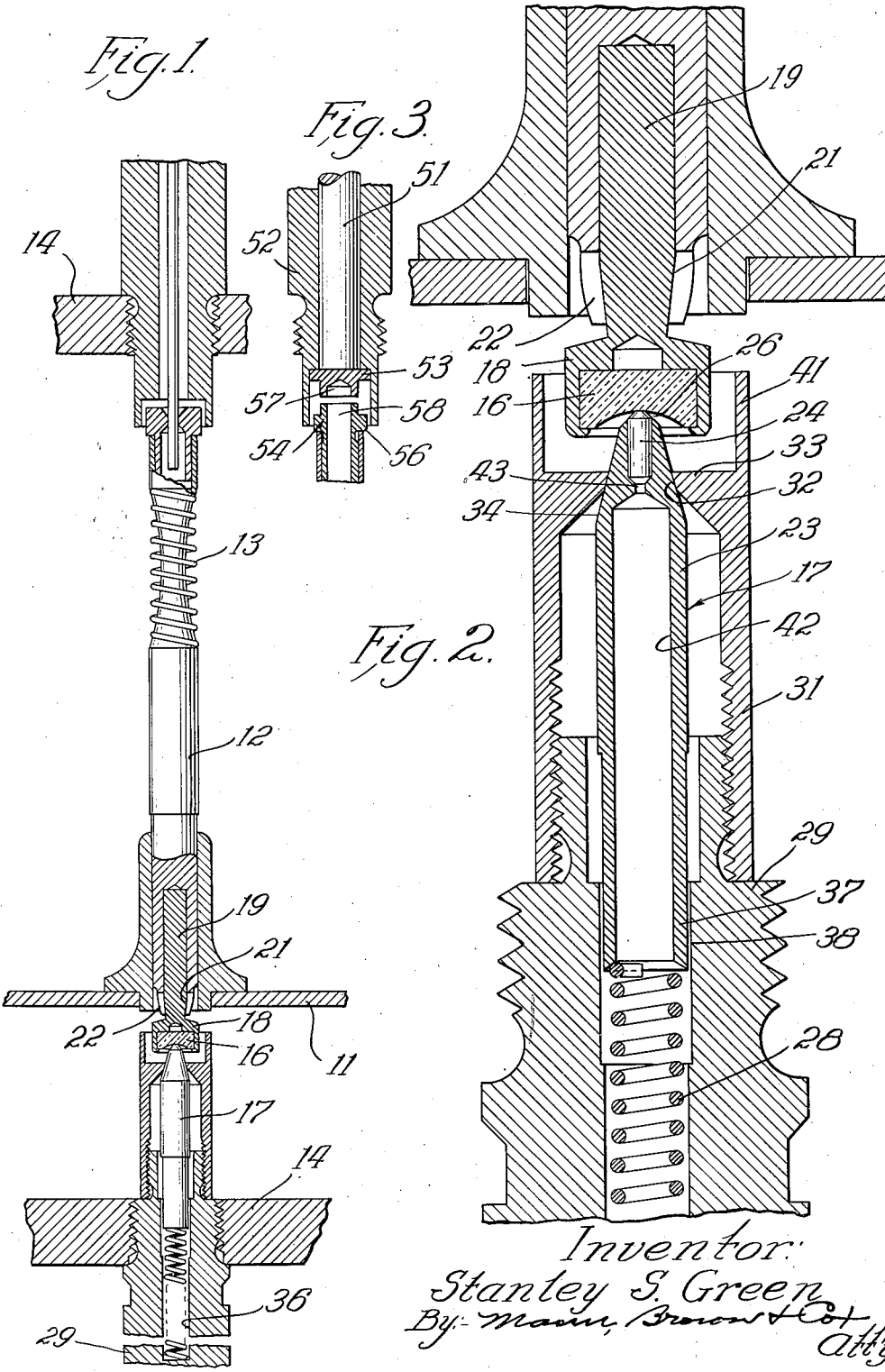
Inventor:
Stanley S. Green INVENTOR.
Stanley S. Green

Patented May 31, 1949

2,471,618

UNITED STATES PATENT OFFICE

2,471,618

INSTRUMENT AND BEARING THEREFOR

Stanley S. Green, La Fayette, Ind., assignor to Duncan Electric Manufacturing Company, La Fayette, Ind., a corporation of Indiana Application May 26, 1943, Serial No. 488,493

23 Claims. (Cl. 308—159)

For many years the moving parts of precision instruments, meters, watches, and the like have been mounted on bearings comprising steel pivots or balls running in jewels, usually natural or artificial sapphires. Lubrication of such pivots has been essential to prevent rapid deterioration due to the abrasive effect of the debris of the steel which, upon oxidizing, becomes quite hard. Efforts to overcome deterioration of the pivots have been directed toward making the pivots harder with the expectation that they would better withstand wear. Such efforts have not had the expected results with respect to withstanding wear.

This problem has been especially severe in watt-hour meters in which the entire weight of the rotating element, sometimes a plurality of disks on a shaft, rests on the extremely tiny point of the pivot so that the contact pressures are exceedingly high. Such high contact pressures may increase the initial production of debris and certainly increase the abrasive effect of hard oxidized debris after it appears. The efforts to make harder pivots have not only failed to produce the expected results but have even resulted in more wear of the jewels and more breakage of jewels due to a hammering action of the hard pivot thereon, either when the meter was jolted in transit or when the disc was jolted inductively by a severe short circuit in the circuit measured by the meter.

This application was a continuation in part of my application No. 330,561, now abandoned, which disclosed a very complete and satisfactory solution of the previously existent bearing problems in so far as watt-hour meters were concerned. That application was in turn copending with an application which has since resulted in my Patent No. 2,203,411, granted June 4, 1940. The subject matter of this earliest patent is a new pivot which is non-oxidizing and hence forms no abrasive debris and will last indefinitely without lubrication and which, furthermore, is soft enough so that it has little tendency to break the jewels.

Sapphire bearing jewels are relatively expensive and under some circumstances are hard to obtain. Jewels of hardness equal to or greater than the sapphire have been regarded as necessary to resist abrasion or gradual wear by the rotation therein of the steel pivots or the grinding of the hard oxidized debris formed thereby. According to the present invention, a less hard jewel may be used with a pivot made of a relatively soft noble metal in accordance with my Patent No. 2,203,411. Both this metal and the slight amount of debris therefrom are soft enough so that there is no danger of causing any appreciable abrasion or wear of the glass jewel. The glass jewel is ideal, not only because glass is readily available and because it has sufficient hardness to resist wear by the metal in question, but also because it can be more easily formed to accurate shapes and can be polished by heat to provide a smoother running surface than is available by lapping. Furthermore, there is the advantage that no minute traces of any abrasive such as would be used in lapping remain in the jewel.

As a matter of fact, the metal is soft enough so that it can be permanently deformed slightly by severe jolts some of which would even have permanently deformed the hard steel pivots or broken the jewels. In my Patent No. 2,203,411, excessive deformation due to jolts or other shocks was avoided by making the original contact area of the pivot on the jewel fairly large and by using a shape of adequate strength at all other points. For some purposes, however, it is desirable to have a smaller initial contact area, in which case deformation from the same jolts would be greater and might be slightly objectionable.

The amount of friction torque (the ability of the friction to resist rotation of a pivot) depends largely on the diameter of the pivot. A given frictional force exerted a long distance from the rotational axis has the advantage of great leverage (more technically a long moment arm). In some instances, a reasonably large diameter in a bearing surface (to give adequate strength against permanent distortion) is not very objectionable because there is plenty of power to spare to overcome the friction. In other instances, however, it is extremely important to keep the effect of friction at a minimum and this necessitates keeping the diameter of the bearing surface extremely small. This might seem to prevent the use of a small pivot of noble metal in accordance with Patent No. 2,203,411 in many instances and the inability to use a soft metal would tend also to make unsatisfactory the use of glass or other materials less hard than sapphires.

According to the present invention, however, the various conflicting considerations are reconciled by using a noble bearing metal in accordance with Patent No. 2,203,411, shaping it with a smaller diameter of bearing surface than would have been considered practicable prior to my invention and making this small diameter with a soft metal practicable by providing a controlled resiliency for one of the bearing members. In the illustrated forms of the invention, the pivot is yieldable with respect to the member which carries it, being yieldable easily under the action of a jolt so that the shock of the jolt is dissipated harmlessly. This is accomplished in part by the provision of a spring mounting for a pivot, the spring either being a separate spring or perhaps resulting from the shape of the shank of the pivot.

The provision of a spring mounting is complicated by the desirability of having the pivot yield appreciably only when there is a jolt. Under ordinary circumstances it should be approximately immovable and accurately positioned with respect to the member on which it is carried. In some instances, it is important to restrict the possible relative movement of the parts narrowly when the pivot does yield, this restriction being independent of the bearing surface so as not to increase the contact pressure thereon. These desirable characteristics have been obtained by the invention at very low expense. The resilient mounting, furthermore, is not always the whole solution for it is desirable to make the yieldable bearing element so light that its inertia will not unduly interfere with its being moved in response to the jolt. The spring mounting of a light weight bearing member would of course be useful even with the hard steel pivots since it would tend to prevent breakage of the jewels.

It will be observed that the same resiliency which permits the use of the softer metal thereby also makes more practicable the use of glass or other such jewels with any pivot.

One illustrated form of mounting is especially suitable for non-corrosive pivots in devices having vertical rotation since it lends itself exceptionally well to mounting the jewel in the disc shaft above a stationary pivot. This inverted mounting with the jewel cup upside down is very advantageous because it keeps debris out of the cup-shaped jewel. Not only do the larger particles of debris or dirt tend to fall out of the cup, but any particles which are so small that they would otherwise cling to the cup are wiped from the bearing contact area of the cup by the action of the rotating jewel. The use of the inverted mounting with a steel pivot would introduce difficulties in keeping oil on the pivot, but these are avoided by the oil-free non-corrosive pivot.

Another illustrated form of bearing is especially suitable for precision instruments of the types where ring jewels are desirable since it provides the necessary lateral flexibility for such a jewel, thus permitting the use of the soft metal with a small surface diameter and preferably with the glass jewel.

Additional objects and advantages of the invention will be apparent from the following description and from the drawings, in which:

Fig. 1 is a fragmentary sectional view of a meter disc and the mounting therefor;

Fig. 2 is a fragmentary sectional view on a greatly enlarged scale, showing the lower bearing construction of Fig. 1;

Fig. 3 is a view corresponding to Fig. 1 but showing a modified form of upper bearing;

One form of meter-type bearing

Figure 4:
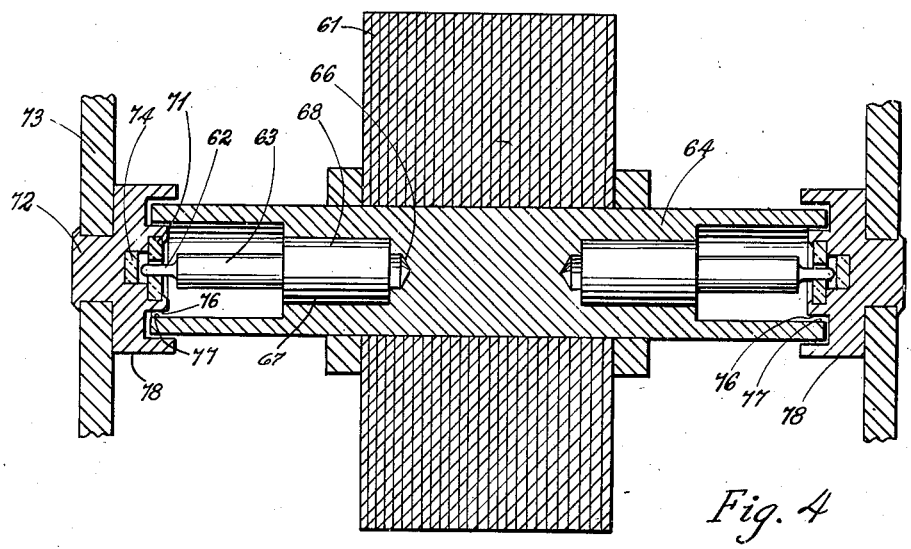
Fig. 4 is a more or less diagrammatic sectional view of another type of instrument utilizing two bearings embodying this invention in a modified form.

The invention has been illustrated in combination with a meter disc 11 which may be of any conventional form, being essentially a flat circular piece of aluminum driven inductively by an electromagnetic driving unit connected in the circuit being measured. The disc 11 is mounted on a shaft 12 which bears a worm 13 through which a gear train is driven to drive the meter register and thus indicate the amount of energy consumed. The bearings for disc 11 and shaft 12 are conventionally supported by brackets 14 forming an integral part of the meter frame.

It is of course very desirable to have the disc rotate very easily so that it can be driven even when the current consumption is very low and so that a minimum amount of light load compensation will be required to overcome friction. It is even more important, and in fact essential, that the friction remain substantially uniform over a long period of time, or, in other words, that the quality of the bearing must not deteriorate. The illustrated form of the invention reduces friction effects to a minimum and at the same time substantially eliminates all forms of deterioration of the bearing so that the bearing may remain satisfactory indefinitely.

In its illustrated form the lower bearing includes a cup-shaped jewel 16 and a pivot 17. The jewel 16, which may be made either of a conventional synthetic sapphire or of a softer material such as glass, is firmly held in a jewel holder 18 having a shank 19 extending into a socket in the shaft 12. The shank 19 may be held in the socket in any suitable manner, as by being slightly tapered at 21 near its lower end and gripped by resilient fingers 22 formed on the bottom of the shaft 12.

The pivot 17 comprises a shank portion 23 and an insert 24. The insert 24, which could also be called the pivot, is made of a material which is truly non-corrosive under service conditions. Several such materials which are suitable and which may be called noble metals are disclosed in my issued Patent No. 2,203,441, the disclosure of which is incorporated herein by reference. The preferred form of the metal is 72% gold, 14.5% copper, 8.5% platinum, 4% silver and 1% zinc (percentage by weight), heated to a hardness of approximately 280 Brinell, as disclosed in said patent.

It is important to note that a metal such as the so-called "stainless steel" is not truly non-corrosive and will not be satisfactory. Stainless steel is stainless by virtue of the formation of a microscopically thin oxide film thereon which is transparent and protects the rest of the metal from oxidization. This thin oxide film, however, is in fact a portion of the metal which has already been corroded by oxidization and it is very hard. If run without oil or if run until the oil supply is exhausted, an abrasive debris will be formed by removal of particles of this hard film by action between the pivot and the jewel. This abrasive debris will act on the pivot, and the pivot will then deteriorate quite rapidly. With the truly non-corrosive metal of which the insert 24 is made, there is no abrasive debris and the pivot can be run millions and millions of revolutions without any significant wear.

As stated in the issued patent, however, the soft metal of which the insert 24 is made is deformed with relative ease. Although 280 Brinell is much harder than many metals, it is considerably softer than pivots which have been conventional heretofore, which may run about 650 Brinell. The softer metal will stand ordinarily high pressures without deformation, but, because the entire weight of the meter disc including its shaft is conventionally carried by a very small area of the pivot, the pressure in terms of pounds per square inch may be very high. For example, on conventional hard steel pivots the pressure due to the weight of the disc at rest is probably in the nature of 90,000 to 125,000 pounds per square inch.

In addition to the problem of sustaining the static load, there is a problem of sustaining the much greater pressures of dynamic loads produced when the meter or its disc is jolted. For example, a contact diameter of .001 inch might be adequate to withstand the static load, but in the case of severe jolts it would be woefully inadequate, and a pivot of this contact area would crumple or be squashed out. Such jolts may be produced either by jolting the entire meter in shipping or handling or by jolting the disc by the inductive effect of a severe short circuit in the circuit measured by the meter. In the copending application it was pointed out that a contact diameter of .003 inch would be appreciably increased by these jolts, but that the effect of the jolts would be steadily decreased as the initial contact diameter was enlarged, the jolts having almost no effect on a contact diameter of about .012 inch. An enlargement of the diameter does not make the pivot unsatisfactory but does change the length of radius of the torque arm of the friction so that the frictional torque is increased. Accordingly, a change in contact diameter is undesirable. On the other hand, it was recognized that the small contact area was desirable in reducing the frictional torque or moment.

According to the issued patent the preferred contact diameter was stated to be a compromise, namely approximately .008 inch. Non-corrosive pivots having this diameter of contact surface have proved to be a great advance in the art and have given results far better than any pivots theretofore known. They were, however, subject to one defect which, though apparent rather than real, makes the use of a smaller contact surface commercially desirable. This one defect was that in shipping or handling a meter, dust or other dirt could get under the contact area and cause an apparent error in the accuracy of the meter. The error is considered only apparent because after a few revolutions of the disc the dirt would be kicked out from under the contact surface, and thereafter the accuracy of the meter would be unimpaired. It may be observed, incidentally, that the pivot was designed to have a wide angle of clearance indicated at 26 between the sides of the pivot and the jewel so that dirt not actually caught in the contact area would be substantially unobjectionable. Nevertheless, some customers testing the meter would make a light load test prior to rotating the disc the few revolutions necessary to bring it to its stable condition, and the accuracy of the meter would erroneously appear to be unsatisfactory. It has been discovered that with a contact diameter as low as .003 inch this apparent or false error, which may be called a stabilization error, virtually disappears. It is negligible even with a contact diameter as large as .005 inch. Because of this stabilization error, it is desirable commercially to use a pivot having a contact diameter in the neighborhood of .003 inch if this can be done with the highly desirable non-corrosive metal and without having the contact area increase during service because of jolts. This is made possible in accordance with the present invention.

According to the form of the present invention shown in Figs. 1 and 2, the pivot 17 is spring mounted, that is, it rests on a spring 28 so that in the case of a jolt of a force which would otherwise flatten the pivot and enlarge the contact area, the pivot yields instead. The spring 28 and the pivot 17 are both carried by a pivot holder 29 which includes the main portion to which the number 29 is applied and a retainer 31 in the form of a removable extension thereof. The retainer 31 has an opening 32 therein formed by an annular ring 33. The pivot shank 23 extends through the opening 32 and has a conical or tapered end portion 34 which engages the ring 33. The spring 28 drives the shank 23 upwardly until it seats against the ring 33, and the spring is strong enough so that the mere weight of the disc will not unseat the shank 23. Thus, it is seen that the pivot is substantially immovable except under the influence of jolts. When there is a jolt which would otherwise deform the pivot and enlarge its contact area, the pivot yields, compressing the spring 28, so that no deformation of the pivot takes place. The spring 28 is of course normally maintained under compression by the retainer or cap 31 which screws down onto the pivot holder 29. The spring 28 of course seats against the bottom of the bore 36 in the pivot holder 29.

It is highly desirable, at least with the present highest quality meters, that the pivot 17 be accurately and uniformly centered so that the position of the disc at rest will be uniform. In the illustrated structure this is accomplished in part by virtue of the steep taper 34 which engages the ring 33 of retainer cap 31. This taper is sufficiently steep so that the pivot is reliably centered in the ring 33 by action of the spring 28. The same steepness prevents dirt from settling on the taper to keep it from seating on ring 33. A canting of the pivot about the ring 33 as a fulcrum or axis is prevented by a snug fit of the remote end 37 of the pivot in a corresponding bore portion 38. The bore portion 38 may be accurately reamed and the end portion 37 of the pivot may be accurately swaged so as to give a very small clearance. It will be observed that the end 37 is approximately nine times as far from the ring 33 as is the bearing surface at the end of the insert 24. It follows that, with respect to a canting movement about ring 33 as a fulcrum, the possible lateral movement of the contact tip of the pivot is only about one-ninth of the possible lateral movement of the remote or butt end of the pivot, so that with a clearance of .002 inch around the butt end the possible lateral displacement of the contact tip of the pivot is in the order of .0002 inch, and it is evident that this movement is extremely small and obviously negligible.

The retainer 31 is provided with an extension 41 which corresponds to the conventional dust cap for the bearing and also serves to positively prevent displacement of the jewel 16 laterally from the pivot 17.

Although the pivot has been shown mounted in the pivot holder 29, it is obvious that it could alternatively be mounted in the shaft 12, in which case the jewel 16 would be mounted in the pivot holder or bearing holder 29. Indeed, this alternative positioning has been conventional heretofore. In short, it has been conventional to have the pivot on top extending down into the upright cup of the jewel. This has been considered necessary in order that oil could be retained in the cup of the jewel to keep the pivot from oxidizing and rapidly deteriorating under the grinding action which would follow. With the use of the preferred non-corrosive pivots, however, the lubrication is not necessary and in fact is undesirable, the friction being so slight that oil actually increases the friction. Accordingly, it is now preferred to position the pivot below the jewel and have it extending up into the inverted cup of the jewel. This arrangement may for convenience be referred to as "inverted." The inverted arrangement has a definite advantage that any dirt tends to fall out of the cup or jewel 16 and therefore away from the contact or bearing surfaces. Any large particles would fall by gravity. Some of the particles, however, are so fine that they might tend to cling to the surface of the jewel. Any such tendency is prevented by the wiping action of the pivot on the jewel, which scrapes aside any foreign matter. It may be noted, incidentally, that this desirable cleaning action is increased by virtue of the fact that the driving force applied inductively to the disc will under heavy loads move the disc off center so that in effect the pivot wipes the foreign matter away from the center of the cup.

Not only does the spring 28 thoroughly protect the pivot from having its contact surface enlarged by jolts, but it also thoroughly protects the jewel from being broken by jolts unless of course the jewel happens to be defective and subject to internal strains which make it very easily broken. This function of protecting the jewel would of course be performed by the spring mounting even if a conventional hard steel pivot were used, although the protection might not then be as safe as with the preferred metal. Likewise, a spring mounting of the jewel would have the same advantage. The jewel could of course be mounted in substantially the same way as the pivot is mounted. In the case of a ball type of meter bearing, one of the jewels could thus be spring mounted to protect the jewels from breakage due to jolts.

The spring 28 is preferably a stainless steel spring and is heat treated to give it stable characteristics. It is not necessary to have extreme uniformity of the spring, however, since it is only necessary theoretically for it to be able to support the weight of the disc and yield to jolts of such severity that the contact area of the pivot would otherwise be enlarged. To ensure reliability, however, it is desirable to have it support much more than the weight of the disc and yield a safe margin below the theoretically necessary yield point. In commercial practice it has been found convenient and entirely satisfactory to keep the strength of the spring, when compressed to the extent of the normal compression with the parts in the positions shown, in the range of 120 to 150 grams. The 120 grams is several times the strength necessary to support the conventional single disc assembly with which it is most often used (weighing about 16 grams), and 20 grams in excess of the weight of some polyphase disc assemblies with which it is used. A spring strength at least 15 grams in excess of its normal load is believed highly desirable. To distinguish from bearing structures in which 15 grams might be relatively insignificant, it is noted that this exceeds 30% of the weight of the conventional single disk assembly contemplated.

One advantage of the illustrated construction is that the pivot 17 is very light. From the standpoint of preventing deformation of the pivot, this is even more important than having a low yield point for the compressed spring. In other words, the inertia of the pivot is an important factor in causing deformation. Even if we assume no spring at all, a jolt of the disc is in effect a hammer blow against the pivot. It can perhaps better be visualized as a blow of the pivot against a stationary jewel. If the pivot were thrown or shot or pounded by its own weight alone against the jewel, so that it moved against the jewel at a given speed, the amount of enlarging of the contact area of the pivot would depend on the momentum or weight of the pivot. This momentum of a moving body is similar to the inertia of the stationary pivot, and hence the enlarging of the contact area of the stationary pivot depends on the inertia thereof. The illustrated pivot is sufficiently light so that ordinary jolts will not enlarge its contact area at all. To attain this lightness it is drilled out from its butt end almost to the insert 24. The bore 42 thus formed is preferably connected by a small bore 43 with the bore into which the insert 24 is pressed. There is a very tight press fit between the insert 24 and the shank 23, with the result that, except for bore 43, air would be trapped behind insert 24. Such air sometimes has oil vapor mixed with it and the mixture has been known to explode.

It is important to note that the movement of the pivot 17 is opposed only by the spring 28 and a gaseous medium, namely air. If it operated in oil, the oil would have to be displaced and even aside from small clearances, this would in effect, increase the effective inertia of the pivot. If the bore 42 of the pivot were oil filled instead of hollow, the oil would have to move with the pivot and in effect be part of it.

Before the pivot 17 can seat against the bottom of counter-bore 38, the jewel holder 18 comes to rest on ring 33, if movement of the disc is not otherwise prevented, and thus relieves the pivot and jewel from any further shock. The jewel holder 18 can be provided with downward extensions to reduce the amount of movement permitted. It may be noted, also, that the home position of holder 29 (also pivot 24 and ring 33) can be adjustable as in my Patent No. 2,206,887.

Although any designer may make wide variations in the dimensions, it may be helpful to note a few of the dimensions which have been found to be satisfactory: length of pivot 17, .480 inch with a tolerance (either way) of .002 inch; angle of taper 34, 15° from cylindrical, taper starting .385 inch from the butt end of the pivot; outside diameter of butt end portion of pivot, .77 inch with a tolerance of .0005 inch; diameter of reamed bore 38, .079 inch with the same tolerance. The 15° taper of hole 32 may be formed with extreme uniformity by swaging the retainer cap 31 over a polished pin, the end of which is tapered. A spring of thirty coils of .011 inch diameter stainless steel of a free length of $45/64$ inch, being compressed in assembly to $17/32$ inch, has been found to give a satisfactory tension. The other dimensions may be approximately determined from Fig.

2, which is drawn approximately to scale. The diameter of the contact surface is preferably from .003 to .005 inch.

Upper bearing

The upper and lower bearings are accurately spaced apart by being screwed home in their brackets 14. The lower bearing described may be used with any upper bearing, as, for example, that illustrated in Fig. 1 and described in my prior Patent No. 2,167,049 and now used. Tests indicate, however, some such type of upper bearing as illustrated in Fig. 3 may soon be preferred since this bearing is frictionless and wearless. This is fully described in my Patent No. 2,333,647, issued November 9, 1943. According to this feature of the invention a bar magnet 51 is inserted in an upper bearing holder 52, being secured therein in any desired manner. The lower end of this magnet is in contact with a soft iron pole piece 53 secured in holder 52 and having a circular face adjacent but slightly spaced from a soft iron armature 54, having a pressed fit with the upper end of the shaft 12. A flange 56 on armature 54 ensures its proper positioning. Pole piece 53 and armature 54 may be solid but it is preferred that each be drilled out, as seen at 57 and 58, so as to concentrate the available magnetic flux in a narrow annular band. This arrangement not only exerts a strong upward pull on the shaft 12 but also has a very strong centering effect, since a slight lateral movement of the end of the shaft lengthens substantially all parts of the magnetic path between the pole piece 53 and the armature 54.

It will be observed that the magnet 51 will exert a strong upward pull on the shaft 12. Conceivably it could be strong enough to support the shaft and disc. As a matter of practice it is preferred that the magnet 51 be too weak to support the shaft 12 with the disc thereon even in the uppermost position of the shaft 12. Thus, the shaft will always rest on the pivot 17 so that the disc will be properly positioned thereby. In supporting part of the weight of the shaft 12, the magnet relieves the pivot 17 of some of its load and thus cooperates slightly with the spring 28 in avoiding deformation of the pivot. The partial magnetic support of shaft 12 also reduces the friction at the lower bearing since it reduces the contact pressure.

Journal type bearing

Fig. 4 illustrates another form of this invention shown in combination with an armature which could be regarded either as the armature of an indicating instrument in which case it probably will never make a complete revolution, or the armature of a clock motor in which case it may make billions of revolutions. In each instance, it is very important to minimize the effects of friction with its consequent wear.

Low friction is exceptionally important in various types of electrical instruments if accuracy of indication is desired as is usually the case. It is, of course, obvious that the torque available in the instrument for driving the indicator must exceed the frictional torque or moment or else the indicator won't move at all. In nearly all indicating types of electrical instruments, however, the net torque (the difference between bias torque and driving torque) available for overcoming friction reduces to zero as the indicator approaches its true reading. The closeness with which the driving torque can bring the indicator to its true reading with reliability, therefore, depends in any given instrument on how small the friction can be made. In other words, in any instrument, the accuracy is reliable only to that degree of closeness to absolute accuracy at which the net driving torque is still greater than the frictional torque or moment.

As previously discussed, one of the controlling factors in reducing the moment of friction is to reduce the diameter of the bearing surface so that the friction operates at a shorter leverage. For that reason, it is important to keep the pivots 62 in Fig. 4 as small as possible. Of course for commercial instruments, there is no use making the pivot so small that the jolts or jars or vibration encountered in service are likely to bend it. How small it can be made without being bent depends in part upon the nature of the metal. Other things being equal, a pivot made of noble metal could not be as small in diameter as a pivot made of a good grade of properly treated steel.

However, there are advantages in using the noble metal in accordance with my Patent No. 2,203,411. As taught therein, it has indefinite life, doesn't wear out the jewel, and does not need lubrication. This not only avoids the problem of lubrication, but in some instances actually decreases the friction because in these instances, the dry friction is so extremely small that the effects of the surface tension and viscosity of the oil would be significant additions thereto. Another important advantage in the use of this metal is that it makes the use of glass jewels entirely satisfactory and practicable.

The underlying facts are a little different in connection with clock motors and other small motors or the like. In a clock motor the friction moment should be low because the power available is small, also bearing wear should be negligible because total revolutions run into the billions (3600 R. P. M. for one year equals $1.875 \times 10^9$ revolutions). In the past with clock motors this has led to an effort to keep down the speed (and hence revolutions) and to the use of expensive small ball bearings or to complicated systems of lubrication. It should be remembered that for a given amount of material the power output of a motor goes down directly as the speed so that reducing total-revolutions is a costly way of giving longer bearing life. Also with special lubricating systems the trouble has always been to get the oil to stay put without attention, renewal or maintenance, year after year. This is a large order and has in many cases required much of the small motor system to be sealed in oil which is difficult to do simply or reliably. Furthermore, a clock motor must be cheap and simple.

Elimination of all oil in a clock motor entirely changes certain aspects of construction. It radically changes the entire problem. By being free to use 3600 R. P. M. or 1800 R. P. M. or 1200 R. P. M. (all at 60 cycles) instead of some lower speed—and this without worrying about the bearings, means that generous power can be secured from a small and cheap motor. Since there is no oil, it cannot evaporate, gum or clog or give trouble with extreme temperature changes (as in outdoor clocks). The extremely small cylindrical bearing diameters possible with this construction solves the problem of low friction as effectively as the finest of ball bearings and yet the construction in accordance with this invention is safe to use under the rough impacts of ordinary handling or shipment.

As in Figs. 1 and 2, the key to using the softer noble metal and the softer glass jewel is resiliency. In Fig. 4, the resiliency is found mainly in an elongated shank 63 for carrying the pivot 62. Of course this elongated shank could be mounted either in the rotating member or the stationary member. In the illustrated form, it is mounted in the rotating shaft. The term "rotating" of course includes pivoting less than a complete revolution.

The dimensions of the spring shank 63 and of course also the dimensions of the pivot 62 will depend on the nature of the armature 61, particularly its weight, and the conditions which the pivot must withstand. In almost any instrument, it is desirable for the armature 61 to be centered with a high degree of accuracy. Accordingly, the shank 63 should be stiff enough so that under mere operational forces, it will not be resiliently distorted to an appreciable or objectionable degree.

Likewise the pivot 62 must be accurately centered with respect to the shaft 64. One way to accomplish this is to drill a hole 66 in the shaft 64 and then accurately counterbore it to receive a plug 68 as a press fit. The plug 68 may be an integral extension of shank 63.

Another way of centering the pivot 62 with respect to the shaft 64 is to have a loose fit between the plug 68 and a bore 67 and hold the pin 62 and shaft 64 accurately positioned with respect to one another by a fixture while soldering the plug in place in accordance with my prior Patent No. 2,167,649. The walls of the hole and plug should be tinned before the assembly. According to this method, pellets of solder are melted in the hole while the parts are held accurately positioned and there are no forces to disturb the correct position of the plug in the hole. Hence accurate centering is reliably obtained.

To provide the necessary resilient characteristics economically, the shank 63 may be formed of steel. In that event, and especially with larger pivot sizes the pivot 62 may, if desired, be formed of a steel core integral with the shank 63, the core being coated with the noble metal by any suitable process such as the metal spraying process, a coating of from .002 to .003 inch thickness being sufficient. As an alternative, the pivot 62 may be a solid noble metal wire inserted with a press fit into a hole (not shown) bored into the shank 63.

The pivot 62 may run in any conventional bearing. For example, there may be a ring jewel 71 suitably mounted in a holder 72 which in turn may be rigidly secured in a frame member 73. In addition to the ring jewel 71, there may also be an end or plate jewel 74 if the device is of a nature for this to be desirable, as would usually be the case with any end thrust, gravitational or otherwise. Both the jewels 71 and 74 are preferably made of glass.

It will be observed that as lateral shifting occurs between shaft 64 and frame 73, the shock of the jolts which produce such lateral shift will be taken up by the spring shank 63 rather than being transmitted entirely to the pivot 62 and jewel 71 with a force which would be likely to either bend the pivot or break the jewel.

It will be apparent, however, that in flexing to accommodate the shock, the shank 63 assumes a slightly curved position momentarily. This slight curved position will result in a canting of the pivot 62 with respect to the rotational axis. There is enough clearance between the pivot 62 and the ring jewel 71 to accommodate the necessary slight degree of canting. The clearance has been greatly exaggerated in the drawings.

Of course any ring jewel such as 71 should ordinarily be positioned as close as practicable to shank 63 so as to put the least possible bending strain on the thin pivot 62.

It will usually be important to limit the relative movement between shaft 64 and ring jewel 71. This might be important to prevent more canting of the pivot 62 than the clearance would accommodate or prevent damage (such as bending) to the pivot or shank otherwise resulting from excessive relative movement; or it might be important in order to keep the armature 61 within a predetermined distance of its correctly centered position. According to the present invention, the limitation of shaft displacement is accomplished by providing supplementary bearing surfaces 76 and 77 which are normally spaced apart by a clearance considerably greater than the minute clearance around the pivot 62. In some classes of instruments, the normal clearance around bearing 76 may be held as low as .002 inch. In other instruments, it may be desirable or expedient to make it .005 inch, or even higher. Of course the bearing surface 76 should be accurately concentric with the bearing surface of the ring jewel 71, and the bearing surface 77 should be accurately concentric with the axis of the shaft 64. The extent to which these surfaces are polished will depend largely upon the likelihood that they will come into engagement during operation, although at best, the frictional moment when they do come into engagement will be several times the frictional moment when only the pivot 62 and ring jewel 71 are in engagement. The bearing surface 76 is preferably on the inside of the bore of shaft 64 since the frictional moment arm is shorter than on the outside. However, if it were desirable for any reason to do so, the auxiliary bearing surface could be formed on the inside of an external annular shoulder 78. If this shoulder is provided in addition to bearing surface 76, perhaps as a dust guard, its clearance with shaft 64 should be slightly greater than the clearance of bearing surface 76 with shaft 64 so that the latter will serve as the auxiliary bearing.

The noble metal used for pivots 62 (and all other pivots herein) is preferably the alloy specified above and disclosed on page 4 of Patent No. 2,203,411.

In the form of the invention shown in Fig. 4, especially if a steel core is used in the pivot, hardness may be much less important than in the form of the invention shown in Figs. 1 and 2. Accordingly, other forms of metal or other material may be suitable. In general, any surface material would be suitable if the pivot as a whole has the required strength and if both the surface metal and any debris therefrom is non-abrasive in the bearing and if the surface material is not appreciably worn down.

Figures 5, 6, 7:
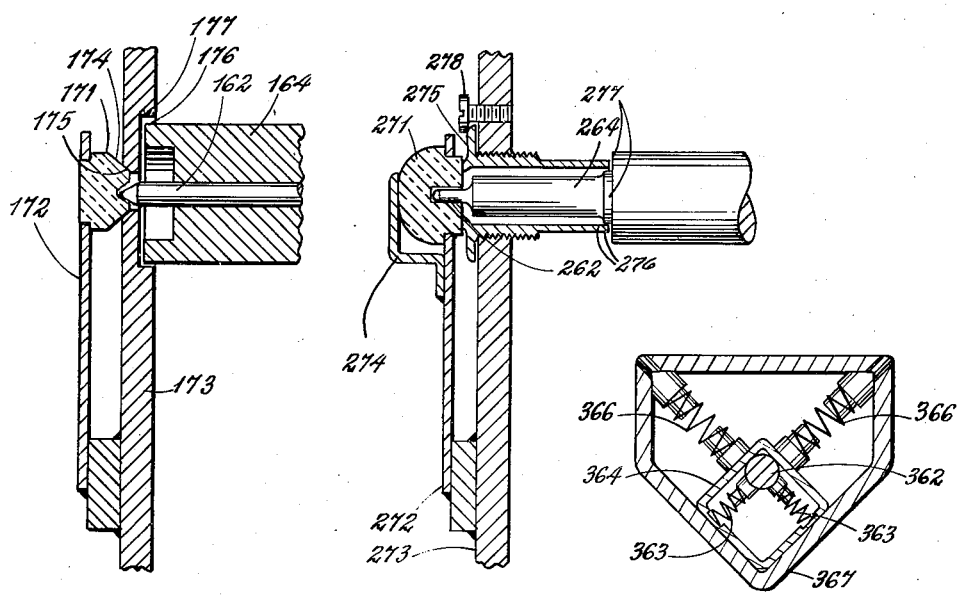
Figs. 5 and 6 are fragmentary sectional views of modified forms of bearings embodying this invention.
Fig. 7 is an end view of a modified form of pivot mounting embodying this invention.

In Fig. 5 is illustrated another form of the invention which is especially suitable for bearings of the type used for example in miniature instruments in which the indicator shaft has V-type pivots at both ends running in V-type jewels. According to this form of bearing, the shaft and its pivot could be the same as shown in Fig. 4, (except for tip shape perhaps) although a slight simplification thereof has been shown in which the pivot 162 has a pressed fit in shaft 164. A V-type jewel 171 is urged by a spring clip 172 against frame plate 173. A conical surface 174 is accurately formed on the front face of the jewel 171 for engagement with the aperture of plate 173. Alternatively, a fairly sharp circular edge of jewel 171 could bear in a conical aperture of plate 173. By a hot forming process, such edge or the face 174 can be formed quite accurately in its relationship to the bearing surface 175 so that the bearing surface will be accurately positioned. Since the contact point with pivot 162 is in the plane of the contact circle between cone 174 and plate 173, the centering is especially accurate; slight tilting of the jewel having almost no effect. However, tilting of the jewel 171 out of its proper angular position is prevented by the fact that the spring clip 172 has a close (but not tight) engagement with the reduced portion of the back side of the jewel. This can be a V engagement or press fit under some circumstances.

Auxiliary bearing surfaces 176 and 177 are formed respectively on the plate 173 and shaft 164, these surfaces, however, being normally held out of contact by the pivot 162.

It will be observed that solely as a result of the mounting of the jewel this bearing has resiliency in all directions. Axial movement of pivot 162 will move jewel 171 outwardly, against the tension of spring 172, until shaft 164 strikes frame plate 173. Radial movement of the tip of pivot 162 will slide jewel 171 radially and rearwardly, with movement along the V engagement surfaces, until auxiliary bearing surfaces 176 and 177 come into engagement. The ratio of the forces necessary to move the jewel 171 radially and axially will depend on the slope of the V engagement, among other things, and hence may be varied by design. If the axis is horizontal the V surfaces will shed dust better if their angle with the axis is less acute than in Fig. 2, where the more acute angle sheds dust better. The coefficient of friction between glass and metal is low enough so that these surfaces can be as steep as around 70° from the horizontal axis and still allow a margin of safety (for dependable return of bearing 171 to proper position) beyond the minimum angle of slide which in the case of fire-polished glass on metal is in the neighborhood of the surprising low value of 15° from the perpendicular or less. By minimum angle of slide is meant the smallest angle between a line perpendicular to the surface of the glass and the direction of force applied to metal thereon at which said force will cause sliding between the glass and the metal. At present it is preferred to use that angle which will give a resistance to initial radial movement against spring 172 equal to initial resistance of spring 172 to axial movement. This appears to be in the order of 50° from the horizontal.

The normal position of jewel 171 is exactly determined. The clip 172 is normally under tension so that an appreciable force must be exerted on pivot 171 to move it. This jewel 171 is of a small size and low inertia and its movement is opposed only by the spring 172. Since it does not need to have a large body to give it strength for impact resistance, it can be made smaller than conventional jewels. Its body can even be relatively smaller than shown, as compared to the jewel face.

The hole into which jewel 171 extends may well be polygonal instead of round so that there will be less chance of foreign matter being caught between the walls of the hole and the conical surface of the jewel. The spacing of the two opposed jewels can be quite accurately determined by accurate formation of the holes, whether round or square, and either or both of them may be ground to space the jewel seats accurately with respect to one another.

The pivot can be quite stiff in this form to position the moving part accurately even if it is quite heavy. Of course resiliency in the pivot (or its shank) can be provided if desired, especially (as illustrated) a slight resiliency to absorb very minor shocks with the quickest possible return to normal.

Fig. 6 shows still another form of the invention. In this figure, resiliency is again provided in all directions and in addition, the jewel has some canting resiliency slightly different from that in Fig. 5. Here again, the pivot 262 may be the same as the pivot of Fig. 4, but it has been shown simplified, this time optionally being integral with shaft 264. The jewel 271 is held rigidly secured in spring clip 272 which is mounted on plate 273. The jewel 271 may have a press fit with clip 272 and may be further retained by a retaining member 274.

The clip 272 accurately positions the jewel 271 in all respects except its axial position. The axial position is determined by the fact that the spring clip 272 normally presses the jewel 271 against stop ring 275 which screws in the plate 273 so that the axial positioning of jewel 271 is slightly adjustable. An extension of ring 275 forms bearing surfaces 276 cooperating with the bearing surfaces 277 formed by shaft 264. Again these auxiliary bearing surfaces 276 and 277 will normally be held out of contact by pivot 262, but will limit movement of the shaft.

Both clips 272 and 172 are wide enough to have substantially no axial resiliency, although they may twist easily.

It will be observed in this instance that jewel 271 serves both as a ring jewel and as an end jewel. The bottom of the recess of jewel 271 is preferably flat throughout the zone where it will be engaged by the pivot. If not, the pivot 262 is of slightly sharper shape at its end than the bottom of the bearing recess of jewel 271. Of course these same mounting and pivot features could be used with other jewels.

Probably there will always be enough clearance between the pivot 262 and any ring jewel in which it moves freely to take care of the slight canting of pivot 262 which is permitted by auxiliary bearing surfaces 276 and 277. If there should not be enough clearance, however, it may be observed that the spring clip 272 will permit the jewel 271 to be canted slightly by the pivot 262. Since the plane of clip 272 intercepts the main bearing surfaces these need not be materially displaced radially by the canting action.

After the stop ring 275 has been adjusted to give just the right clearance at the end of pivot 262 for freedom of motion, it may be locked in its adjusted position by set screw 278.

The pivots 162 and 262 may have their bearing surfaces coated with a noble metal or the entire bearing portion of the pivot may be formed of the noble metal as a wire inserted in the shank of the pivot, as discussed in connection with previous figures. Even with ordinary steel pivots the mountings are desirable for protecting the jewel and permitting use of smaller diameters.

Ordinarily, it will prove possible for the pivot shanks to provide enough resiliency to protect the bearing while still being stiff enough to maintain the rotating part accurately centered. In case this should have proved impossible in any particular construction, the pivot may be mounted as shown in Fig. 7 so as not to yield from a predetermined exactly centered position unless a force beyond any desired minimum is exerted on it. It should be understood that Fig. 7 is very diagrammatic for the purpose of illustrating the principle and that in actual production, simplifications and improvements would be made.

In Fig. 7, a pivot 362 is pressed by springs 363 against an inside corner of a square pivot holder 364. The pivot holder 364 in turn is pressed by springs 366 against an inside corner of a polygonal outer holder 367 which would be rigidly positioned on the rotating element or on a frame so as to accurately center the pivot 362.

It will be observed that the pivot 362 can move in any radial direction with respect to outer holder 367 by compressing one or more of springs 363 and 366. However, it cannot move in any downward direction without compressing one of the springs 363 and it cannot move in any upward direction without compressing one of the springs 366. No such compression is balanced out by the expansion of another spring and hence it takes a force at least equal to the compressional tension under which the various springs exist in order to move the pivot 362 relatively from its centered position. In this instance, the jewel should engage the pivot 362 as close as practicable to the holders so that the pivot will have no appreciable resiliency. Again the pivot 362 preferably has a noble metal surface. Of course the pivot could be a pivot of substantial diameter having no appreciable resiliency if necessary for it to project from the holders. It could be used with any of the jewel arrangements illustrated. Means similar to bearing surfaces 276 and 277 should be provided for limiting the displacement of outer holder 367 with respect to the jewel engaged by pivot 362 independently of the pivot. The movement is not as easy in a right or left quadrant, as holder 364 must slide on holder 367. Accordingly, when there is a choice, mounting in the position shown or rotated 180° will be desirable. However this is not essential, and lubrication of the sliding parts could be resorted to, as by making holder 364 of an oil impregnated metal such as "Oilite."

All of the jewels herein shown may be made of glass. For glass jewels a hard glass has heretofore been considered necessary. According to the present invention any ordinary glass can be used even if it is not one of the harder glasses. Any other suitable material which can be polished can be used; for example sapphires, porcelain and "Steatite," or other ceramic products. Nonceramic plastics including synthetic resins could also be used. However, glass is at present preferred.

I claim:

1. A bearing assembly for a rotative member and the like, including a holder, a pivot shiftable in the holder, urged in one direction by a spring and limited in its movement in said direction by means engaging the pivot near its tip and having an automatic centering action thereon, said pivot being elongated and having a close fit with the holder at a point remote from the tip to prevent canting of the pivot and being hollow to reduce its inertia, and a cup-shaped jewel carried by the rotative member and resting on the tip of the pivot.

2. A bearing assembly for a rotative member and the like, including a holder, a pivot shiftable in the holder, urged in one direction by a spring and limited in its movement in said direction by means engaging the pivot near its tip and having an automatic centering action thereon, said pivot being elongated and having a close fit with the holder at a point remote from the tip to prevent canting of the pivot and being hollow to reduce its inertia, and a cup-shaped jewel carried by the rotative member and resting on the tip of the pivot, said spring being several times as strong as necessary to hold the pivot against the limiting means in normal service.

3. A bearing assembly for a rotative member and the like, including a holder, a pivot shiftable in the holder, urged in one direction by a spring and limited in its movement in said direction by means engaging the pivot near its tip and having an automatic centering action thereon, said pivot being elongated and having a close fit with the holder at a point remote from the tip to prevent canting of the pivot, and a cup-shaped jewel carried by the rotative member and resting on the tip of the pivot, said spring being several times as strong as necessary to hold the pivot against the limiting means in normal service.

4. A bearing assembly for a rotative member and the like, including a holder, a pivot shiftable in the holder, urged in one direction by a spring and limited in its movement in said direction by means engaging the pivot near its tip and having an automatic centering action thereon in response to spring pressure alone in spite of its normal lead, and a cup-shaped bearing carried by the rotative member and resting on the tip of the pivot.

5. A bearing assembly for a rotative member and the like, including a holder, a pivot shiftable in the holder, urged in one direction by a spring and limited in its movement in said direction by means engaging the pivot near its tip and having an automatic centering action thereon in response to spring pressure alone in spite of its normal load, said pivot being elongated and having a close fit with the holder at a point remote from the tip to prevent canting of the pivot, and a cup-shaped bearing carried by the rotative member and resting on the tip of the pivot.

6. A bearing assembly for a rotative member and the like, including a holder, a pivot shiftable in the holder, urged in one direction by a spring and limited in its movement in said direction by means engaging the pivot near its tip and having an automatic centering action thereon in response to spring pressure alone in spite of its normal load, said pivot being elongated and having a close fit with the holder at a point remote from the tip to prevent canting of the pivot.

7. A bearing assembly for a rotative member and the like, including a holder, a pivot shiftable in the holder, urged in one direction by a spring and limited in its movement in said direction by means engaging the pivot near its tip and having an automatic centering action thereon in response to spring pressure alone in spite of its normal load.

8. A bearing assembly including two bearing members, one of which is a pivot and the other of which bears on the tip of the pivot, one of said bearing members being shiftably carried by a holder and being urged by resilient means in one direction therein and limited in its movement in said direction with respect to its holder to a position maintaining pressure in the resilient means equal to several times the normal load to be carried, whereby the bearing functions without resiliency in the absence of exceptional forces sufficient to flex the resilient means.

9. A bearing assembly including two bearing members, one of which is a pivot and the other of which bears on the tip of the pivot, one of said bearing members being shiftably carried by a holder and being urged by resilient means in one direction therein and being limited in its movement in said direction with respect to its holder to a position maintaining sufficient pressure in the resilient means to cause the bearing normally to function without resiliency in the absence of forces sufficient to compress the resilient means, the movement limiting means having a "V" type engagement with the shiftable member with a sufficiently steep slope to cause the latter to be centered by operation of the resilient means with its normal load thereon.

10. A bearing assembly including two bearing members, one of which is a pivot and the other of which bears on the tip of the pivot, one of said bearing members being shiftably carried by a holder and being urged by resilient means in one direction therein and limited in its movement in said direction with respect to its holder to a position maintaining sufficient pressure in the resilient means to cause the bearing normally to function without resiliency in the absence of forces sufficient to flex the resilient means, the movement limiting means having a "V" type engagement with the shiftable member near its tip with a sufficiently steep slope to cause the latter to be centered by operation of the resilient means with its normal load thereon.

11. A bearing assembly including two bearing members, one of which is a pivot and the other of which bears on the tip of the pivot, one of said bearing members being shiftably carried by a holder and being urged by resilient means in one direction therein and limited in its movement in said direction with respect to its holder to a position maintaining sufficient pressure in the resilient means to cause the bearing normally to function without resiliency in the absence of forces sufficient to flex the resilient means, the movement limiting means having a V type engagement with the shiftable member near its tip with a sufficiently steep slope to cause the latter to be centered by operation of the resilient means with its normal load thereon, and said member being confined as to lateral movement at a point remote from the limiting means.

12. A bearing including a pivot having a bearing surface thereon, an acutely beveled portion adjacent its bearing surface, and a shank remote therefrom, and a pivot holder including stop and centering means engaging the beveled portion of the pivot, a spring urging the pivot into such engagement, and means confining the remote end of the pivot to prevent lateral displacement thereof.

13. A bearing including a pivot having a bearing surface thereon, a beveled portion near its bearing surface, and a shank remote therefrom, and a pivot holder including stop and centering means engaging the beveled portion of the pivot, a spring urging the pivot into such engagement, and means confining the remote end of the pivot to prevent lateral displacement thereof, said pivot being substantially vertically disposed and facing upwardly and said tapered portion being at such a steep angle as to cause dirt falling thereon to fall therefrom.

14. A bearing including a pivot having a bearing surface thereon, a beveled portion near its bearing surface, and a shank remote therefrom, and a pivot holder including stop and centering means engaging the beveled portion of the pivot, a spring urging the pivot into such engagement, and means confining the remote end of the pivot to prevent lateral displacement thereof, said pivot being hollow through the majority of its length to reduce the inertia thereof.

15. The combination of a rotative element and bearings therefor at opposite ends of the axis of rotation, the bearing at one end including a bearing member which is resiliently supported to prevent bearing injury at that end by jolts of the rotative element, and the bearing at the other end including a magnet which laterally positions the adjacent portion of the rotative element entirely by magnetic force and urges the rotative element in a direction to reduce the pressure on the bearing members at the first-named end of the axis.

16. A bearing assembly including two bearing members, one of said bearing members being urged by resilient means in one direction and being limited in its movement in said direction with respect to its holder to a position maintaining sufficient pressure in the resilient means to cause the bearing normally to function without resiliency in the absence of forces sufficient to flex the resilient means, the movement limiting means having a V type engagement with the shiftable member with a slope at least several degrees steeper than the minimum angle of slide between the materials forming the V engagement.

17. A bearing assembly including two bearing members, one of said bearing members being urged by resilient means in one direction and being limited in its movement in said direction with respect to its holder to a position maintaining sufficient pressure in the resilient means to cause the bearing normally to function without resiliency in the absence of forces sufficient to flex the resilient means, the movement limiting means having a V type engagement with the shiftable member with slope at least several degrees steeper than the minimum angle of slide between the materials forming the V engagement; the engagement of said bearing members being close in the axial direction to the V engagement.

18. A bearing assembly including two bearing members, one of said bearing members being urged by resilient means in one direction and being limited in its movement in said direction with respect to its holder to a position maintaining sufficient pressure in the resilient means to cause the bearing normally to function without resiliency in the absence of forces sufficient to flex the resilient means, the movement limiting means having a V type engagement with the shiftable member with a slope at least several degrees steeper than the minimum angle of slide between the materials forming the V engagement; the engagement of said bearing members being close in the axial direction to the V engagement, and said member being confined as to lateral movement at a point spaced from said plane.

19. The combination of a bearing assemly and a load carried thereby including two bearing members, one of which is a pivot and the other of which bears on the pivot, one of said bearing members being effectively low in inertia and shiftably carried by a holder, and being urged by resilient means in one direction therein and limited in its movement in said direction with respect to its holder to a position maintaining the resilient means sufficiently flexed to exert a continuing pressure on said bearing member in the range of at least 30%, and not less than 15 grams, in excess of the load borne by the bearing member.

20. The combination of a bearing assembly and a load carried thereby including two bearing members, one of which is a pivot and the other of which bears on the pivot, one of said bearing members being effectively low in inertia and shiftably carried by a holder, being exposed, on its surfaces facing in one direction in which it can shift, to a gaseous medium, and being urged by resilient means in the opposite direction and limited in its movement in said direction with respect to its holder to a position maintaining the resilient means sufficiently flexed to exert a continuing pressure on said bearing member in the range of at least 30% and not less than 15 grams, in excess of the load borne by the bearing member.

21. Apparatus including a frame, a movable element, and bearing means for supporting the movable element with respect to the frame including a bearing member carried by the frame and a bearing member carried by the movable element, and resilient means for mounting one of said bearing members, one of said bearing members being formed of glass, and the other of said bearing members having its bearing surface formed of a metal which will not corrode under service conditions and which is softer than glass.

22. The combination of a bearing assembly and a load carried thereby including two bearing members, one of which is a pivot and the other of which is a glass jewel, one of said bearing members being effectively low in inertia and shiftably carried by a holder, being exposed, on its surfaces facing in one direction in which it can shift, to a gaseous medium, and being urged by resilient means in the opposite direction and limited in its movement in said direction with respect to its holder to a position maintaining the resilient means sufficiently flexed to exert a continuing pressure on said bearing member in the range of at least approximately 5 grams in excess of the load borne by the bearing member, the bearing surface of said pivot being shaped with a radius of curvature greater than the radius of the pivot to provide a contact diameter with the other bearing member of at least .003 inch and being formed of a material which is softer than glass and which does not corrode to a harder form under service conditions.

23. The combination of a bearing assembly and a load carried thereby including two bearing members, one of which is a pivot and the other of which is at least as hard as glass and bears on the pivot, one of said bearing members being effectively low in inertia and shiftably carried by a holder, being exposed, on its surfaces facing in one direction in which it can shift, to a gaseous medium, and being urged by resilient means in the opposite direction and limited in its movement in said direction with respect to its holder to a position maintaining the resilient means sufficiently flexed to exert a continuing pressure on said bearing member in the range of at least approximately 5 grams in excess of the load borne by the bearing member, the bearing surface of said pivot being shaped with a radius of curvature greater than the radius of the pivot to provide a contact diameter with the other bearing member of at least .003 inch and being formed of a material which is softer than glass and which does not corrode to a harder form under service conditions.

STANLEY S. GREEN.

REFERENCES CITED

The following references are of record in the file of this patent:

UNITED STATES PATENTS

| Number | Name | Date |
| --- | --- | --- |
| 331,311 | Marquardt | Dec. 1, 1885 |
| 474,286 | Brewster | May 3, 1892 |
| 881,202 | Schofield | Mar. 10, 1908 |
| 943,890 | Prisant | Dec. 21, 1909 |
| 1,114,101 | Boast | Oct. 20, 1914 |
| 1,120,641 | Aldrich | Dec. 8, 1914 |
| 1,366,132 | Pitkin | Jan. 18, 1921 |
| 1,406,502 | Shand | Feb. 14, 1922 |
| 1,450,738 | Case | Apr. 3, 1923 |
| 1,594,054 | Fiego | July 27, 1926 |
| 1,843,868 | Copelin | Feb. 2, 1932 |
| 2,092,281 | Knopp | Sept. 7, 1937 |
| 2,099,854 | Kurz | Nov. 23, 1937 |
| 2,203,411 | Green | June 4, 1940 |
| 2,270,141 | Potter | Jan. 13, 1942 |
| 2,316,920 | Weber | Apr. 20, 1943 |

FOREIGN PATENTS

| Number | Country | Date |
| --- | --- | --- |
| 18,917 | Great Britain | 1890 |
| 422,744 | Great Britain | Jan. 17, 1935 |